United States Patent [19]

Engdahl et al.

[11] Patent Number: 5,307,699
[45] Date of Patent: May 3, 1994

[54] SEISMIC INITIATOR FOR EARTHQUAKE SHUTOFF VALVES AND THE LIKE

[75] Inventors: Paul D. Engdahl, 3101 Fairview, Space 133, Santa Ana, Calif. 92704; Roger P. Engdahl, Costa Mesa, Calif.

[73] Assignee: Paul D. Engdahl, Costa Mesa, Calif.

[21] Appl. No.: 55,868

[22] Filed: May 3, 1993

[51] Int. Cl.⁵ .............................................. F16K 17/36
[52] U.S. Cl. .......................................... 74/2; 137/45; 251/65; 200/61.45 M
[58] Field of Search ............... 137/38, 39, 45; 251/65; 200/61.45 M; 74/2

[56] References Cited

U.S. PATENT DOCUMENTS 5,074,327 12/1991 Reid ........................................ 137/38
5,115,829 5/1992 Franzke ................................. 137/38

FOREIGN PATENT DOCUMENTS 119265 9/1980 Japan ..................................... 137/38

Primary Examiner—Robert G. Nilson
Attorney, Agent, or Firm—Lawrence Fleming

[57] ABSTRACT

An acceleration-responsive magnetic device for closing a valve or operating a switch or the like in response to a disturbance such as an earthquake. A pendulum operates to increase the length of a magnetic path, releasing a magnetic element to perform the desired actuation.

9 Claims, 2 Drawing Sheets

5,307,699

SEISMIC INITIATOR FOR EARTHQUAKE SHUTOFF VALVES AND THE LIKE

FIELD OF THE INVENTION

This invention relates primarily to valves that automatically shut off the flow of gas or other flammable or hazardous fluid in response to an earthquake, explosion, or like disturbance, and in particular to acceleration-sensing initiating devices to initiate such closure. The invention also concerns other applications of such initiating devices, such as actuation of an electrical switch.

RELATED ART

The present invention is intended primarily as a seismic sensor and initiator to be employed as part of an automatic shutoff valve of the kind shown in my co-pending U.S. application Ser. No. 921,074, filed Aug. 29, 1992 now U.S. Pat. No. 5,209,454. Other seismically actuated shutoff valves are shown in U.S. Pat. No. 4,844,113 to Jones, and No. 5,115,829 to Franzke.

Prior such valves generally employ a combination of a semi-confined steel ball attracted by a movable magnet which operates to hold the valve open. Earthquake accelerations make the ball roll out of position with respect to the magnet, releasing the magnet and permitting the valve to close.

Ancient Chinese records show seismometer-like instruments having several balls resting in chutes differently inclined. A mild earthquake would bring out the ball in the chute nearest the horizontal; stronger shocks would shake the balls out of steeper ones, and so on. The chutes were fashioned in the shape of dragon's heads.

The problem addressed here is one of discriminating between minor shocks or vibration and ground motion capable of damage, so that the valve is closed only for the latter. There are ANSI (American National Standards Institute) and State of California standards of vibration frequency and acceleration for these conditions of "close" and "don't close".

BRIEF SUMMARY

The present invention comprises an acceleration-responsive ferromagnetic armature element or initiator which operates to hold open a flapper valve via the attraction of a magnet embedded in the flapper, or to hold a switch open in similar manner. An appropriate valve is shown in my copending application Ser. No. 921,074 referred to above. The present armature device may replace the steel ball assembly shown therein (FIGS. 10-12) or the solenoid shown in other Figures.

In the present invention, the armature swings or tilts in response to acceleration of the case, increasing the distance between its ferromagnetic portion and the magnet sufficiently to release the magnet and initiate closure of the valve or other operation.

In the preferred embodiment of the invention, the armature device comprises a cylindrical ferromagnetic pin or rod which normally stands upright in the center of a cylindrical cavity. The bottom end of the pin is the element that is attracted by the magnet in the flapper, holding the valve open. This bottom or lower portion is surrounded by a collar of nonmagnetic material. This collar is preferably shaped as a cone or truncated cone. The collar and pin end constitute a foot on which the armature may rest.

When the pin tilts to one side or the other, it becomes supported only by the edge of the collar, so that its bottom end is lifted upward, farther from the magnet. The magnetic attraction is reduced and the flapper falls away to close the valve.

The means for tilting the pin is a weight or mass loosely connected to the upper portion of the pin. The looseness permits the mass to slide a small distance, around 2 mm, before becoming capable of tilting the pin. This sliding or free play permits the armature assembly to "ignore" case displacements smaller than the free play but to function to release the magnet on larger displacements. This is an important feature of the invention.

In the preferred embodiment the pin passes through an oversize hole in the mass with a radial clearance equal to the amount of free play. The mass is supported on one or more washers, on which it slides during free play, damped by coulomb friction.

The collar, which with the bottom portion of the pin constitutes a foot, rests on the wall in the lower cavity in the base, which is a fairly close fit to permit the armature to tilt but not to slide. The top end of the pin extends into an upper cavity in the cover, which restrains the pin from tilting too far. At the maximum permitted tilt, the center of gravity of the armature assembly lies inside the lower cavity, so that absent any acceleration a tilted armature assembly will right itself.

The cross sections of the armature assembly and cavities are circular to permit response to accelerations in any direction.

IN THE DRAWING

DETAILED DESCRIPTION OF PREFERRED EMBODIMENT

Figure 1:
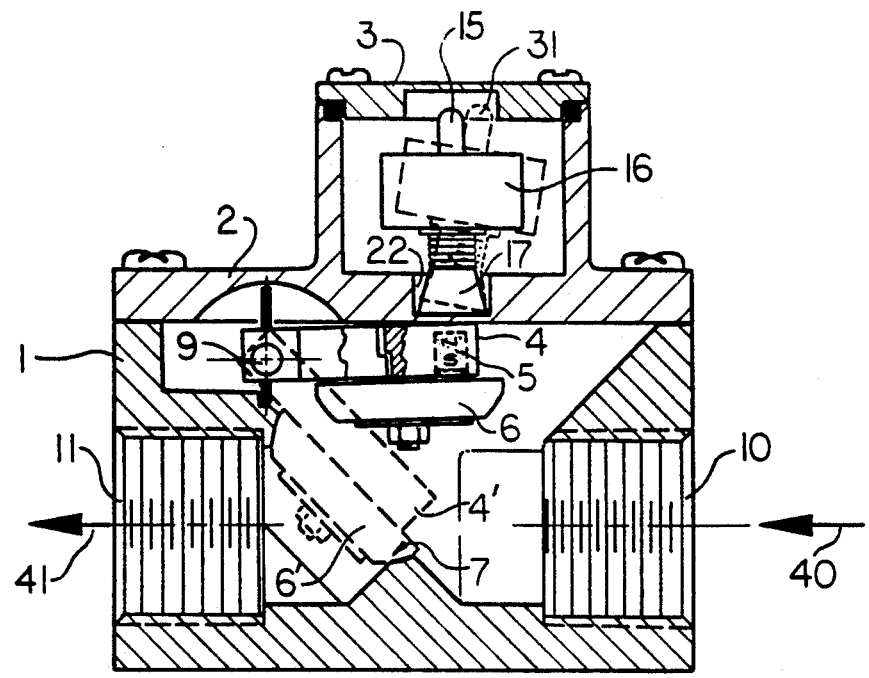
FIG. 1 is a side sectional view of an automatic shutoff valve according to the invention.

FIG. 1 shows an automatic shutoff valve according to the invention, having a valve body 1, inlet and outlet ports 10, 11, a valve seat 7, and a swingable flapper arm 4 carrying a sealing element 6. Arm 4 carriers a permanent magnet 5 and is pivoted on a reset shaft 9. All this structure may be the same as that shown (in more detail) in our U.S. Pat. No. 5,209,454.

Arm 4 is normally held in an upward position to keep the valve open, by the attraction of magnet 5 to a suitable ferromagnetic element positioned above it. When the magnetic attraction is suitably reduced the arm drops down by gravity to the position shown in dotted lines at 4', and the valve seat is closed by the sealing element 6 at 6'. Inlet arrow 40 and outlet arrow 41 indicate direction of fluid travel.

The present invention is directed to the acceleration-sensing means for thus reducing the attractive force on magnet 5. In FIG. 1 the means for reducing the attraction is a tiltable armature assembly 15, 16, 17, located in a suitable compartment in a case cover 2. This assembly is indicated in its tilted position in dotted lines in FIG. 1. It is shown more clearly in FIGS. 2-4.

Figure 2:
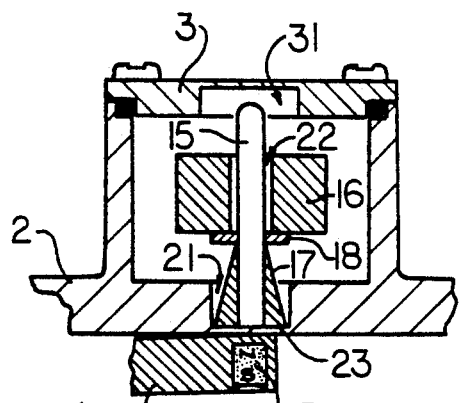
FIG. 2 is a simplified side sectional view of a seismic initiator assembly of the preferred embodiment of the invention with a magnet and a portion of the valve flapper shown in normal "standby" position.

FIG. 2 shows the preferred armature assembly in a rest or standby position. Ferromagnetic pin 15 stands upright on a thin nonmagnetic wall portion 23 of cover 2, at the bottom of a cavity 21, with its bottom end close to magnet 5, holding the valve open. Pin 15 and collar 17 make a foot on which the armature rests. Mass 16 rests slidably on a washer or the like 18 which is fixed to pin 15. Washer 18 may have a low-friction surface. A central hole in mass 16 provides a loose fit around pin 15, with the clearance indicated at 22. An upper cavity 31 in top 3 limits the amount of tilt of pin 15.

Figure 3:
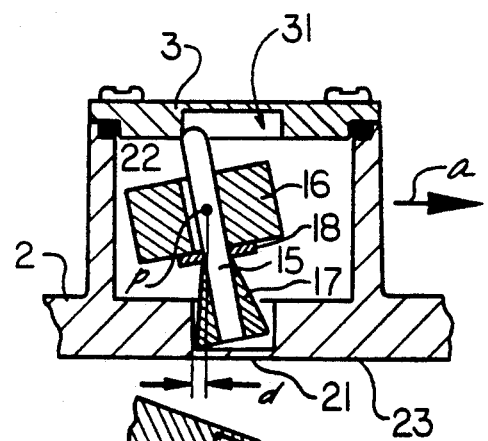
FIG. 3 is a view like FIG. 2 but with the armature tilted and the flapper released.

FIG. 3 shows the structure of FIG. 2 in "tripped" or actuated position. Acceleration of the case in the direction of arrow a has caused the inertial force of mass 16 to tilt pin 15 to the left. Tilting is limited by engagement of the top of pin 15 with the wall of the upper cavity 31. Pin 15 is now supported only from the edge of collar 17, and its lower end has been displaced upward in cavity 21. The displacement is enough to reduce the attractive force of magnet 5 sufficiently to permit flapper arm 4 to fall as shown, to close the valve.

In FIG. 3 it is seen also that mass 16 has slid along washer 18 to the left so that all the clearance 22 is now on that side. Note that center of gravity p falls inside cavity 21 by distance d.

Figure 4:
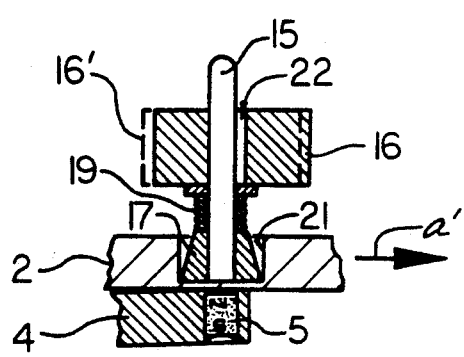
FIG. 4 is a simplified side sectional view of the armature assembly showing the mass displaced sideways as in response to a small-amplitude shock.

The reason for clearance 22 is now considered in connection with FIG. 4. ANSI and California state standards for earthquake-actuated shutoff valves call for actuation at an acceleration of 0.3 g at a frequency of 2.5 Hz, and for non-actuation at 0.4 g at 10 hertz (Hz). At constant acceleration, the displacement amplitude of vibration varies inversely as the square of the frequency. Peak-to-peak displacement at 0.3 g, 2.5 Hz is about 3.2 cm; and at 0.4 g, 10 Hz it is about 0.27 cm. Thus if a threshold displacement a little over 0.27 cm is established below which the valve will not close, the second requirement is met, while the displacement of 3.2 cm at 2.5 Hz is more than adequate to initiate closure.

This threshold may be provided by looseness or play between the inertial mass such as 16 and the ferromagnetic element which it moves, such as pin 15. In FIG. 4 a suitably brief pulse of acceleration indicated by arrow a causes mass 16 to move relative to pin 15 by sliding, the acceleration being understood to cease before the mass has had time to tilt the pin. The "slid" position is indicated in dotted lines. A stack of washers 19 is shown in FIG. 4 instead of the single washer of FIGS. 2-3, but the operation is the same. The stack 19 fits loosely on the shaft and is supported from collar 17.

It will be noted that the armature assembly 15-19 of FIGS. 1-4 is an inverted pendulum.

Figure 5:
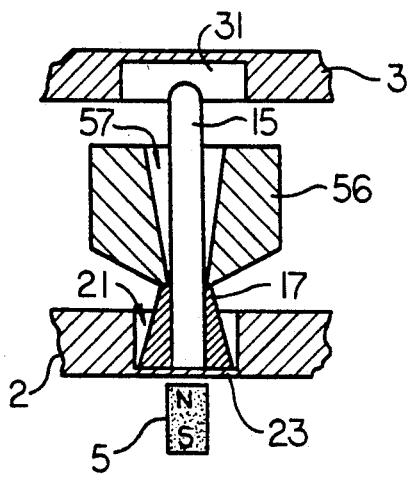
FIGS. 5, 6, 7 and 8 are simplified side sectional views of different modifications of the armature assembly.

FIGS. 5-9 illustrate alternative forms of the invention. In FIG. 5 the structure differs from that of FIGS. 1-4 in that the mass 56 (corresponding to mass 16 of FIGS. 1-4) has a tapered hole 57 instead of a cylindrical hole, so that the threshold displacement or free play exists as a rocking displacement of the mass about its support point on collar 17.

Figure 6:
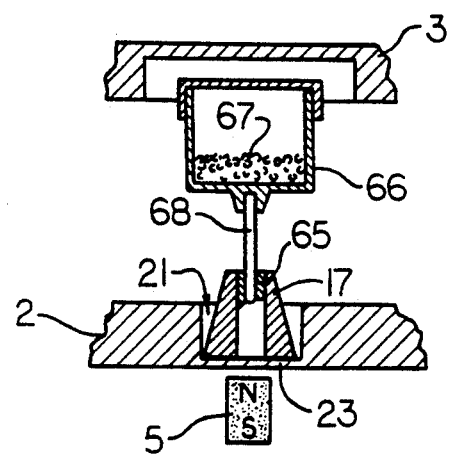

In FIG. 6 the mass 66 is supported on a resilient wire flexure 68 that allows it to swing through a small threshold displacement before tilting the base 17, 65 to release magnet 5. Element 65 is a ferromagnetic pin or rod. Mass 66 may be hollow and partly filled with loose shot 67 or a suitable liquid for inertial damping.

Figure 7:
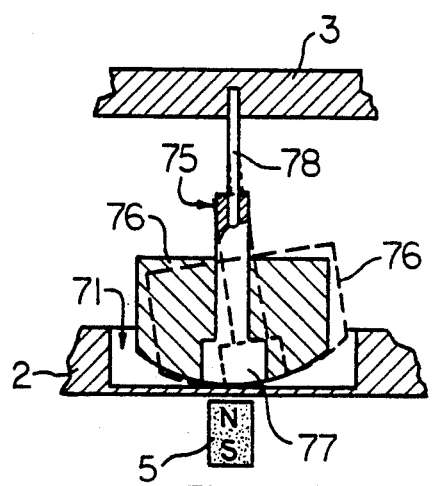

FIG. 7 shows a seismically-responsive armature as a straight or non-inverted pendulum having a mass or bob 76 of nonmagnetic material fixed to and surrounding a pin 75 with a ferromagnetic foot portion 77. These elements hang from a flexure 78 fixed to case cover 3. The flexure may be of wire, or may be replaced by a ball joint. All elements are circular in cross section. Here the threshold or free play function lies in the diameter of foot portion 77, which is larger than the pole portion of magnet 5. Thus the pendulum can swing through a small arc without reducing the ferromagnetic area presented to the magnet; but when it swings farther the attractive force is reduced.

Figure 8:
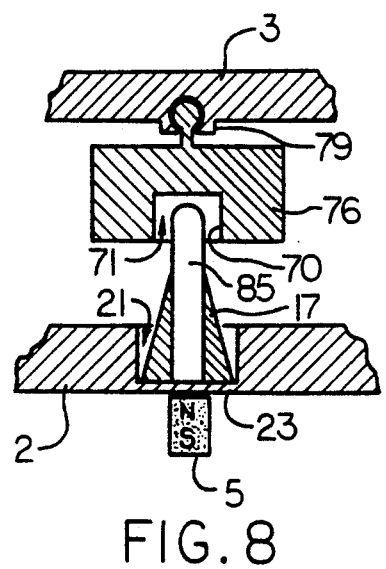

FIG. 8 shows an inverted-pendulum-like structure 85, 17, which will release the magnet 5 when pin 85 is tilted, as in FIGS. 1-6. The tilting however is effected by a separate swingable pendulum-like mass 76 which is supported independently from cover 3 by a ball joint or the like 79. The wall of a cavity 70 in mass 76 must engage the top of pin 85 in order to tilt it, leaving a clearance 71. Vibration amplitude must exceed this clearance before the attractive force on magnet can be reduced to initiate closure of the valve.

Figure 9:
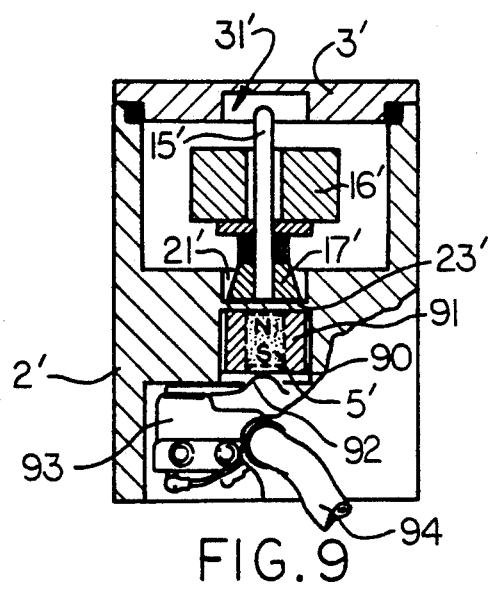
FIG. 9 is a simplified sectional view of an initiator of the invention combined with an electrical switch to actuate it.

FIG. 9 shows an application of the preset initiator device to the actuation of an electrical switch instead of a valve. A suitable housing 2',3' contains a seismic pendulum device of the kind described above, having ferromagnetic pin 15', mass 16', and collar 17', which tilts in response to suitable acceleration. Pin 15' and collar 17' form a foot element which fits tiltably in a cavity 21'; the degree of tilt is limited by contact of pin 15' with the wall of upper cavity 31', similarly to the corresponding elements in FIGS. 1-3.

The foot element rests on a thin nonmagnetic wall element 23'. Below is a guide 90, shown here as a cylindrical cavity, in which a movable actuating element 91 may slide up and down. Element 91 may be suitably weighted and contain a permanent magnet 5'.

When initiator assembly or armature 15'-17' is in its normal upright position it holds element 91 up against wall 23' by the magnetic attraction of magnet 5'. When assembly 15'-17' tilts in response to acceleration, the attraction is reduced, permitting element 91 to drop. It drops onto an operating member 92 of a switch 93, which may be a snap-action switch, actuating it.

Figure 10:
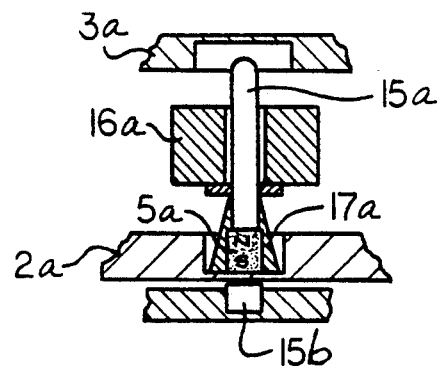
FIG. 10 is a simplified partial sectional view of a modification of a portion of FIGS. 1-9.

Referring now to FIG. 10, it will be apparant that the positions of the magnet such as 5, 5', and of the ferromagnetic element that it attracts such as 15, 15' or 77, may be exchanged. In FIG. 10, a magnet 5a is disposed in the bottom portion of the collar 17a, into which a pin 15a is also secured. When inertial forces on mass 16a cause the assembly to tilt, magnet 5a is displaced upward, reducing its attraction to a soft ferromagnetic element 15b. Element 15b may be disposed in an arm such as 4 (FIGS. 1-4) or in a switch actuator such as 91, FIG. 9.

I claim:

1. A seismic initiating device for holding a movable first magnetic element in a first position and releasing it to a second position upon receiving a predetermined magnitude and duration of acceleration, comprising:

a pendulum having a mass and a connection therefrom to a second magnetic element, said second element being disposed in a rest position near said first element to hold it by magnetic attraction in said first position when said acceleration is absent;

inertial forces on said mass causing angular displacement of said pendulum, said displacement moving said second element away from said first element and reducing said attraction to release said first element to said second position, said connection being constructed to permit a substantial initial displacement of said mass before said second element begins to move.

2. The device of claim 1, wherein said pendulum is an inverted pendulum having a substantially flat foot portion whose center portion is said second magnetic element and of soft magnetic material, and whose peripheral portion is nonmagnetic, and further comprising, a thin wall of nonmagnetic material extending between said first and second magnetic elements, angular displacement of said pendulum causing said foot portion to tilt, moving its center portion upward.

3. The device of claim 2, wherein said connection is a loose fit between said mass and said magnetic element that permits said mass to slide a small distance with respect thereto.

4. The device of claim 1, wherein said second magnetic element is in the form of a pin disposed vertically when in said first position, and said mass has a tapered bore, the smaller diameter of said bore fitting closely over said pin and the larger diameter providing said initial displacement by a rocking displacement.

5. The device of claim 1, wherein said pendulum comprises a foot portion having a ferromagnetic central portion and a nonmagnetic peripheral portion, and said connection is a resilient wire-like member extending upward from said foot portion, said mass being attached to the upper end portion of said member.

6. The device of claim 5 wherein said mass is hollow and contains vibration damping material.

7. The device of claim 1 wherein said mass is suspended swingably from its top portion, and said connection comprises a space in the form of a figure of revolution between said mass and said second magnetic element, whereby said mass must be swingingly displaced by a predetermined amount before engaging said second magnetic element.

8. The device of claim 1, wherein said pendulum is an inverted pendulum comprising a vertically-extending armature having a foot portion and adapted to tilt in response to horizontal acceleration, and further comprising a base having a cavity loosely surrounding said foot portion and a housing spacedly surrounding said armature to restrict its tilting to a degree where its center of mass remains inside the area of said foot portion, so that it restores itself to a vertical position when acceleration ceases.

9. A seismic sensing device and initiator for holding a first magnetic element of a first predetermined diameter in a first position and effecting its release to a second position upon receiving a predetermined magnitude of acceleration, comprising a pendulum containing a second magnetic element of a second predetermined diameter and disposed to attract said first magnetic element to hold it in said first position in the absence of acceleration, said pendulum swinging in response to said acceleration to acquire a displacement from said first magnetic element to effect said release, said first and second diameters being substantially unequal whereby said displacement must exceed a predetermined initial magnitude before said release is effected, and means confining said pendulum to limit its angular displacement to insure its automatic return to said first position when said acceleration ceases.

* * * * *